United States Patent
Likar et al.

(10) Patent No.: US 10,257,036 B2
(45) Date of Patent: Apr. 9, 2019

(54) SECURE PLUG AND PLAY CONFIGURATION OF WIRELESS DISTRIBUTION SYSTEM (WDS) WI-FI RANGE EXTENDERS

(71) Applicant: CLOUDMONDO, INC., Santa Clara, CA (US)

(72) Inventors: Bojan Likar, Cupertino, CA (US); Ihab Abu-Hakima, Los Altos, CA (US)

(73) Assignee: NEUTRINO8, INC., Santa Clara, CA (US)

( * ) Notice: Subject to any disclaimer, the term of this patent is extended or adjusted under 35 U.S.C. 154(b) by 25 days.

(21) Appl. No.: 15/489,586

(22) Filed: Apr. 17, 2017

(65) Prior Publication Data

US 2018/0183666 A1 Jun. 28, 2018

Related U.S. Application Data

(63) Continuation-in-part of application No. 15/391,790, filed on Dec. 27, 2016.

(51) Int. Cl.
| | |
|---|---|
| H04L 12/24 | (2006.01) |
| H04W 16/26 | (2009.01) |
| H04L 29/06 | (2006.01) |
| H04L 12/28 | (2006.01) |
| H04W 88/14 | (2009.01) |
| H04W 12/06 | (2009.01) |

(52) U.S. Cl.
CPC ........ *H04L 41/0809* (2013.01); *H04L 63/062* (2013.01); *H04L 63/18* (2013.01); *H04W 16/26* (2013.01); *H04L 63/0428* (2013.01); *H04W 12/06* (2013.01); *H04W 88/14* (2013.01)

(58) Field of Classification Search
CPC ... H04L 41/0809; H04L 63/18; H04L 63/062; H04L 63/0428; H04W 16/26; H04W 88/14; H04W 12/06
USPC ........................................................ 370/254
See application file for complete search history.

(56) References Cited

U.S. PATENT DOCUMENTS

| | | | |
|---|---|---|---|
| 2014/0073289 A1* | 3/2014 | Velasco ................. | H04W 12/04 455/411 |
| 2016/0212695 A1* | 7/2016 | Lynch ................... | H04W 48/08 |

* cited by examiner

*Primary Examiner* — Faisal Choudhury
(74) *Attorney, Agent, or Firm* — Law Office of Dorian Cartwright

(57) ABSTRACT

A cloud-based onboarding server detects a network change and facilitates an onboarding process for a new access point. An SSID and authentication credentials for an existing Wi-Fi channel are sent over a temporary Wi-Fi channel using a preconfigured SSID and passphrase generated by both the new access point and the master access point. A wireless station scans the identification information from a label on the new access point and sends it directly or indirectly to the master access point, so that both sides have the same seed for generating a matching passphrase. The master access point terminates the temporary channel and reactivates the existing Wi-Fi channel.

9 Claims, 11 Drawing Sheets

SECURE PLUG AND PLAY CONFIGURATION OF WIRELESS DISTRIBUTION SYSTEM (WDS) WI-FI RANGE EXTENDERS

CROSS-REFERENCE TO RELATED APPLICATIONS

This application claims the benefit of priority as a continuation-in-part under 35 U.S.C. 120 to U.S. application Ser. No. 15/391,790, filed Dec. 27, 2016, entitled WIRELESS CONFIGURATION OF WIRELESS DISTRIBUTION SYSTEM (WDS) RANGE EXTENDERS USING NON-WI-FI WIRELESS COMMUNICATION CHANNELS, by Rajinder SINGH, which is commonly owned, the contents of which being hereby incorporated by reference in its entirety.

FIELD OF THE INVENTION

The invention relates generally to a computerized networking system, and more specifically, to secure plug and play configuration of wireless distribution system (WDS) bridges that extend Wi-Fi network.

BACKGROUND

Plug and play networking equipment makes networking friendlier for consumers installing a Wi-Fi (e.g., under a IEEE 802.11 protocol as promulgated by the Institute of Electrical and Electronics Engineers) system out of the box. Entities also desire less complex configurations when making changes to network equipment. Depending on a size of network coverage needed, range extenders are added at "dead areas" to provide extended Wi-Fi access. For example, a range extender can add coverage to a backyard of a home. Also, a range extender can connect two buildings of a corporation.

Conventional configuration techniques for range extenders are performed through a wired connection by a network administrator, over several steps. First, the network admin connects a wire to an access point to receive parameters. Next, the network admin connects a wire to a range extender to upload parameters. Even if the network admin wants to wirelessly connect to the access point and the range extender, the point-to-point nature of Wi-Fi radios prevents a dual connection. Further, interference between multiple Wi-Fi radios would be problematic.

More specifically, WDS is a technique for an access point acting as a master base station to connect with access points acting as slave base stations for extending Wi-Fi range. The master base station needs to receive MAC addresses of the slave base stations, and likewise, the slave base stations need to receive a MAC address of the base station. Other parameters in common include an SSID, a wireless channel, and an encryption mode. As described above, conventional techniques accomplish configurations with a series of wired connections.

What is needed is a robust technique plug and play wireless configuration of wireless distribution system nodes, for example, using a temporary Wi-Fi channel with a known SSID for sending credentials to newly added access points, in a slave or mesh configuration.

SUMMARY

The above-mentioned needs are met with methods, computer products, and devices for a computer-implemented method for secure plug and play configuration for extending a Wi-Fi networking range with wireless distribution bridges.

In one embodiment, a cloud-based onboarding server detects a network change and facilitates an onboarding process for a new access point. Identification information for the new access point is received, from an active access point that is also connected for management by the cloud-based Wi-Fi onboarding server and is authenticated for secure communication on a Wi-Fi network remote from the cloud-based Wi-Fi onboarding server or from a wireless station authenticated to the cloud-based Wi-Fi onboarding server. The identification information is sent on behalf of the new access point but not sent by the new access point. The active access point already connected to the Wi-Fi network is associated with the new access point.

In an embodiment, an SSID and authentication credentials for an existing Wi-Fi channel are sent over a temporary Wi-Fi channel using a preconfigured SSID and passphrase generated by both the new access point and the master access point. In one case, a wireless station scans the identification information from a label on the new access point and sends it directly or indirectly to the master access point, so that both sides have the same seed for generating a matching passphrase. The master access point terminates the temporary channel and reactivates the existing Wi-Fi channel.

Advantageously, out of the box WDS configurations of Wi-Fi networks with range extenders are simplified.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, (non-transitory) computer program products, and systems for wireless configurations of WDS over alternative wireless communication channels, as described herein. One of ordinary skill in the art will recognize variations to the disclosed embodiments that are contemplated, although not explicitly described.

I. Systems for Wireless WDS Configuration System (FIGS. 1-5)

FIGS. 1A-D are high-level block diagrams illustrating various systems 100A-D for plug and play configuration for extension of Wi-Fi networking range using WDS bridges, according to some embodiments. First, in FIG. 1A, a master access point (or master base station) 120A activates an SSID under management of a cloud-based onboarding server 110 that is cloud based. Next, in FIGS. 1B-C a slave access point (of slave base station) 120B uses techniques herein to join the SSID as a WDS bridge to the master access point 120A. In one case of FIG. 1B, a wireless station 130A communicates with a cloud-based onboarding server 100 using the SSID from the master access point 120A and, in another case of FIG. 1C, the wireless station 130A communicates with the cloud-based onboarding server 110 a cell tower 102. Finally, in FIG. 1D, a mesh access point uses techniques herein to join the SSID as a WDS bridge to the slave access point 120B. Advantageously, these embodiments enable plug-and-play ease for users wanting to extend range on a wireless network.

Figure 1A:
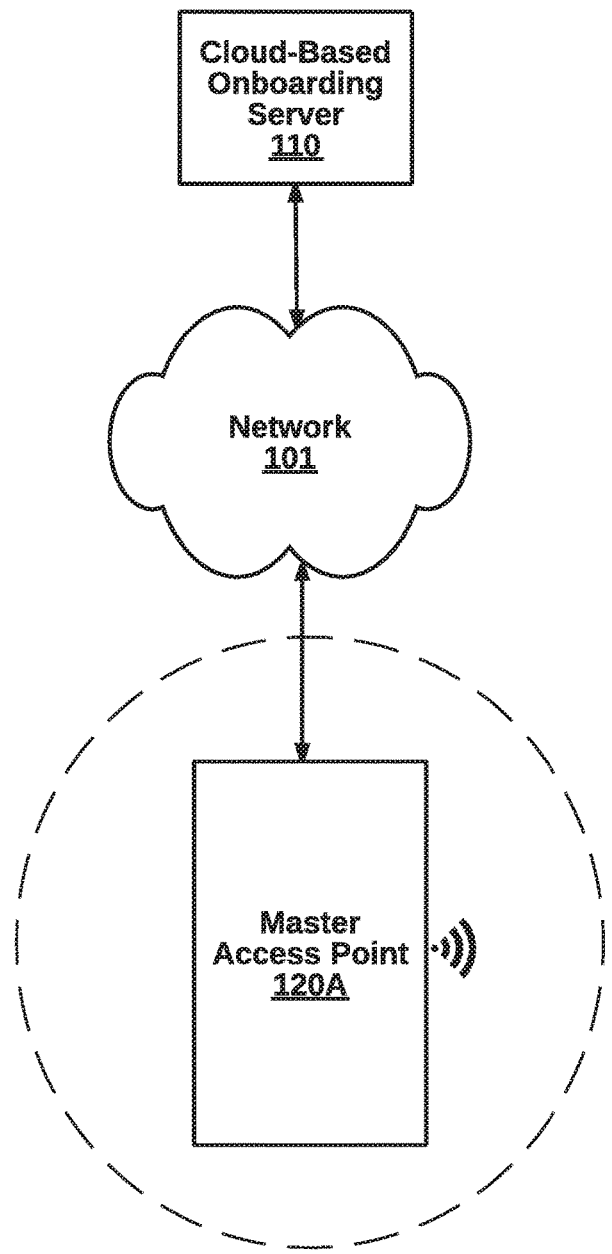
FIGS. 1A-1D are high-level block diagrams illustrating various systems for plug and play configuration for extension of Wi-Fi networking range using WDS bridges, according to some embodiments.
Figure 1B:
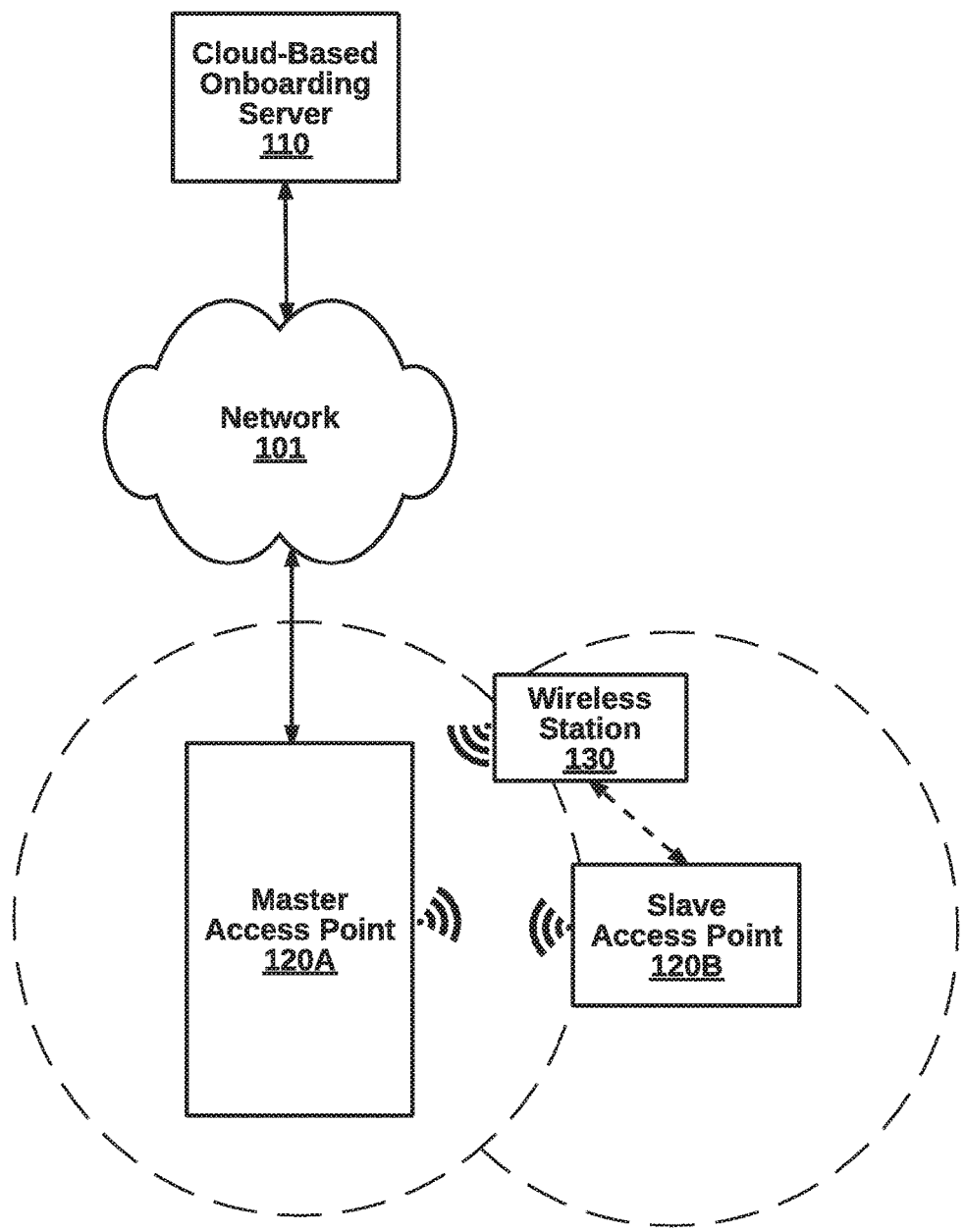
Figure 1C:
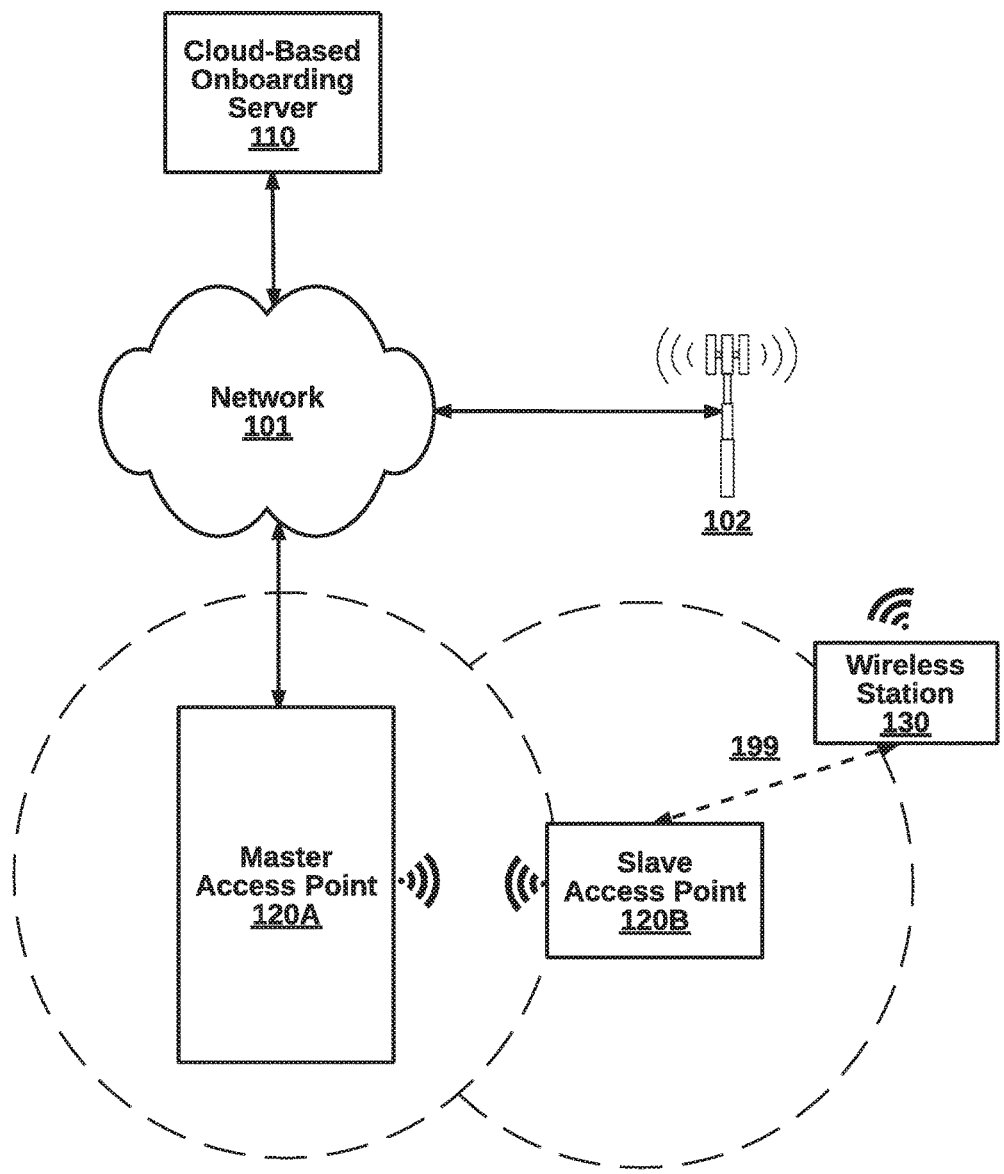
Figure 1D:
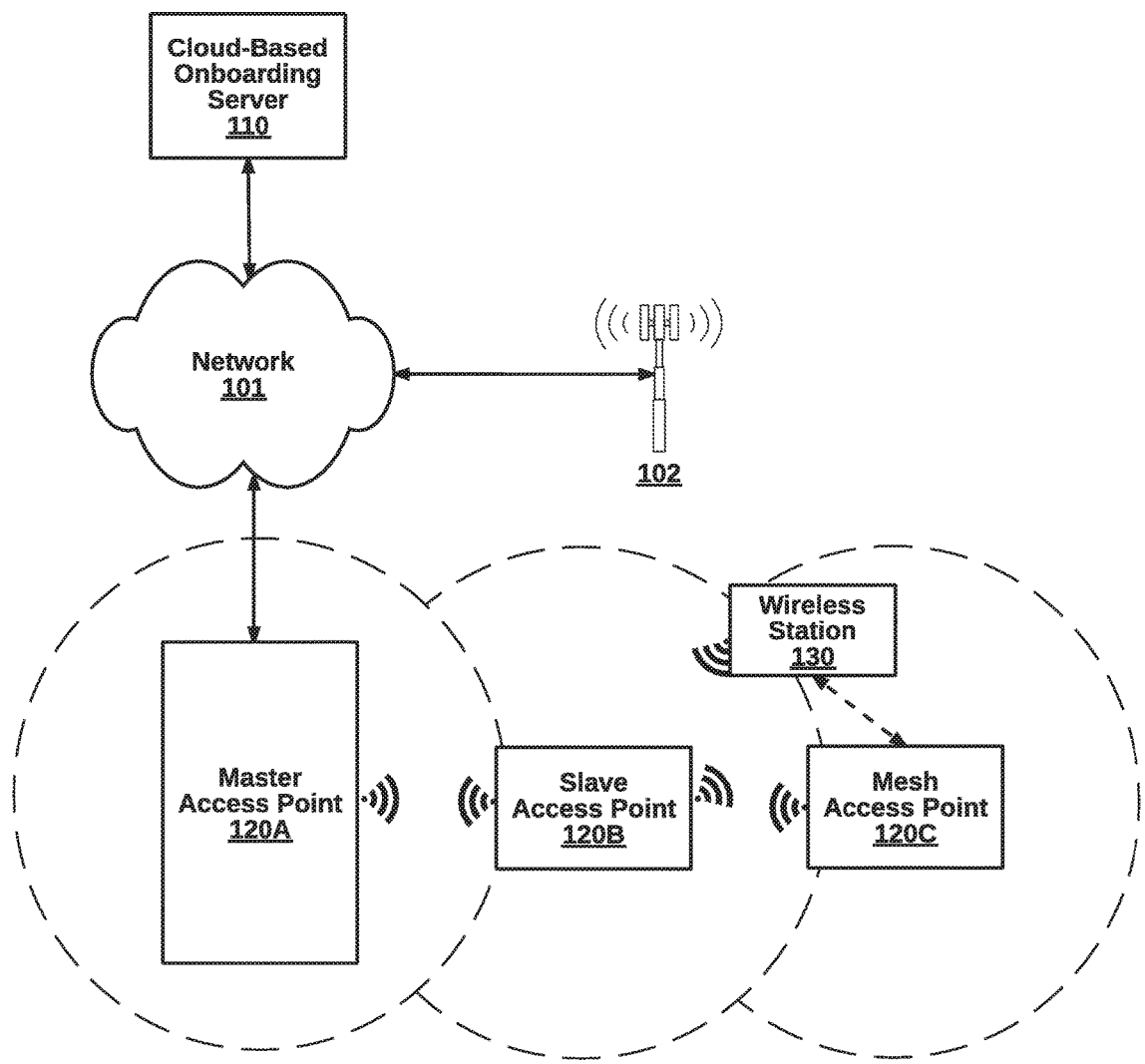

The system 100A of FIG. 1A comprises the cloud-based onboarding server 110 and the master access point 120A. FIGS. 1B and 1C also comprises a slave access point 120B, a wireless station 130 and a cellular-to-data network unit 102. Also, FIG. 1D comprises a mesh access point 120C. In other embodiments of the systems 100A-D, additional network components can also be part of the systems 100A and 100B, such as firewalls, virus scanners, routers, switches, application servers, databases, as well as additional controllers, access points, access switches, stations, and the like. The network components as set forth throughout the different embodiments described herein can be implemented as hardware, software, or a combination of both. The systems 100A-D can be implemented in home networking systems with easy consumer set-up. Also, enterprise networking systems can be quickly deployed and relocated.

The components can communicate through a network 101. The network 101 couples the cloud-based onboarding server 110 to the master access point 120, preferably over a wired connection. In turn, the master base station 120 couples additional devices over Wi-Fi. The network 101 can be the Internet, a wide area network, a local area network, an enterprise network, or the like. The network 101 can be a data network or a cellular network (e.g., 3G or 4G), or a combination of different types of networks.

In FIG. 1B, the slave access point 120B joins the SSID transmitted by the master access point 120A. Cloud control of the slave access point is enabled by the wireless station 130.

The wireless station 130 provides a user interface for access to the cloud-based onboarding server 110, by connection through the SSID for the master access point 120A in the case of FIG. 1A. Furthermore, one embodiment of the wireless station 130 can scan the slave access point 120B for identification information which is then sent to the master access point 120A. This information transfer allows a temporary secure Wi-Fi channel, as discussed below.

Figure 8:
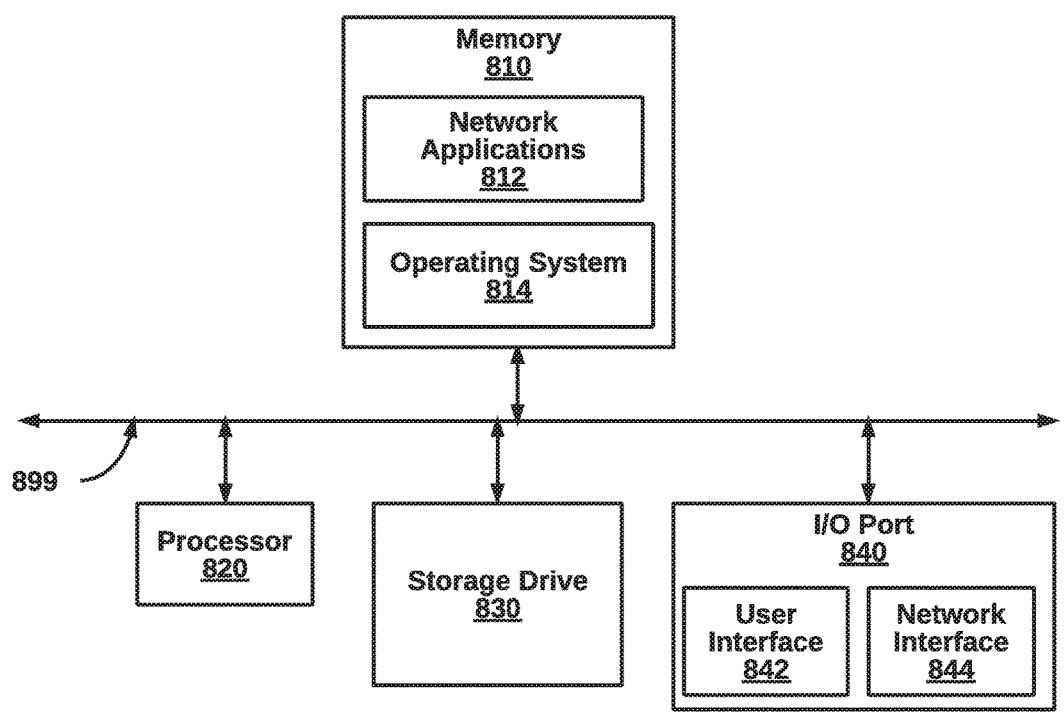
FIG. 8 is a block diagram illustrating an exemplary computing device for implementing the techniques described herein, according to one embodiment.

In some embodiments, the wireless station 130 can be a mobile telephone, a tablet, a phablet, a laptop, or be implemented by any of the computerized devices discussed herein, and generally in FIG. 8. For instance, a smart phone is typically equipped with Wi-Fi and cellular data network transceivers. A mobile app can be downloaded to coordinate between the heterogeneous communication channels and for communication with the cloud-based onboarding server 110. Examples wireless station 130 is described in more detail below in association with FIG. 5.

The cloud-based onboarding server 110 bridges the master access point 120A and the slave access point 110B during configuration of the system 100B. More specifically, the cloud-based onboarding server 110 detects a new access point seeking access to the network 101 over a Wi-Fi channel. In response, some embodiments of the cloud-based onboarding server 110 help facilitate a temporary Wi-Fi channel over a known SSID to pass credentials (or WDS configuration data) for a persistent Wi-Fi network SSID. In normal operations, a Wi-Fi network operates using the persistent Wi-Fi network SSID. The normal operations are temporarily halted when entering a set-up mode, allowing a new access point to connect.

From one perspective, the cloud-based onboarding server 110 provides cloud-based control of network range extension. The automation provided by various services simplifies human interaction during configuration. An access point merely needs to be plugged in and powered up, and scanned from a trusted device (e.g., a digital camera integrated to the wireless station 130). From that point, an automated process eases complexity and human labor.

In an embodiment of FIG. 1C, the cloud-based onboarding server 110 communicates with the wireless station 130 through cellular-to-data network unit 102. In this situation, the wireless station 130 sends identification information of the slave access point 120B (e.g., from scanning 199) that is then passed by the cloud-based onboarding server 110 to the master access point 120A. There may be no direct contact between the master access point 120A and the wireless station 130 when out of radio range, so the cloud-based onboarding server 110 bridges communications over secure channels.

Similarly, in FIG. 1C, the wireless station 130 sends identification information of the mesh access point 120C that is then passed to both the master access point 120A and the slave access point 120B, and any other components of various implementations. This allows different slave access points to be optimized with a determination of which of the different slave access points should service a particular mesh access point. For example, RSSI values for mesh-to-slave connections of access points are measured to identify the highest RSSI value. A particular one of the different slave access points having the highest RSSI can be selected for further service, in some cases.

The cloud-based onboarding server 110 and other components of the system 100 can be any computerized device or processor driven device. Example embodiments include server blades, desktop computers, laptops, smart telephones, tablets, phablets and the like. In some cases, the cloud-based onboarding server 110 is operated by a service provider that services various user accounts for different users. In other cases, the cloud-based onboarding server 110 is owned by the same entity that owns associated access points. The cloud-based onboarding server 110 can be the same entity that manufactures the master and slave base access points 120A-B. More detailed embodiments of the cloud-based onboarding server 110 are set forth below with respect to FIG. 2.

The master access point 120A provides access to the network 101 for wireless stations including wireless station 130 and the slave access point 120B. During configuration, the master access point 120A uses a passphrase derived from identification information of the slave access point 120B to authenticate a connection attempt from the slave access point 120B. The passphrase authenticates an SSID known to both the master access point 120A and the slave access point 120B. A temporary secure Wi-Fi channel is opened up, allowing the master access point 120A to pass SSID and passphrase (encrypted) data to the slave access point 120B. After configuration, the master access point 120A facilitates communications between devices on Wi-Fi and devices communicatively coupled to the network 101. Wireless user stations can now be (indirectly) connected to the network 101 through the slave access point 120B. As a result, the slave access point 120B extends the range of the master access point 120A which appears to the wireless station 130 and other user stations to be the same device as the master access point 120A, in some embodiments.

In example embodiments, the master access point 120 can be an access point running in WDS master mode, a router, or a switch, and be implemented by any of the computerized devices discussed herein, and generally in FIG. 8. More detailed embodiments of the master base station 120A are described in below with respect to FIG. 3.

The slave base station 120B is configured to provide access to the network 101 to wireless stations including the wireless station 130. During configuration, the slave station can communicate with the wireless station 130 over a Bluetooth wireless radio in order to receive WDS configuration data (e.g., dynamic WDS configuration data). After configuration, packets are forwarded from the wireless station 130 to the master base station 120A, and vice versa.

In some embodiments, the slave base station 120B can be a range extender, a repeater, an access point running in a slave mode, and be implemented by any of the computerized devices discussed herein, and generally in FIG. 8. The slave base station 130 is described in more detail below in association with FIG. 4.

The WDS configuration data is synchronized between associated access points to facilitate a wireless connection between the master and slave access points 120A and 120B, in one embodiment. WDS configuration data, in one embodiment, includes MAC addresses, BSSIDs, authentication credentials, wireless channels, encryption modes (e.g., certificates or shared secrets), and other information necessary for a Wi-Fi connection between the master and slave base stations 120A, 120B. There are other embodiments in which the WDS configuration data also includes authentication information or other security information. Dynamic WDS information, in another embodiment, can comprise WDS parameters generated on-the-fly to avoid prior art out-of-the-box WDS parameters that are pre-configured.

In one embodiment, when one of the slave access points is removed from the Wi-Fi network or otherwise disassociated from the master base station 120A, new (dynamic) WDS configuration data can be sent out to all associated access points for re-securing the compromised network.

In still another embodiment, a centralized WDS authentication server, such as a RADIUS server, authenticates master access points and slave access points. This ensures that a slave access point can only associate with the WDS master that belongs to the same owner. In dense deployments having two different master access points with two different owners within range, the centralized WDS authentication server prevents on-boarding a slave access point of owner 1 with a master access point of owner 2.

Figure 2:
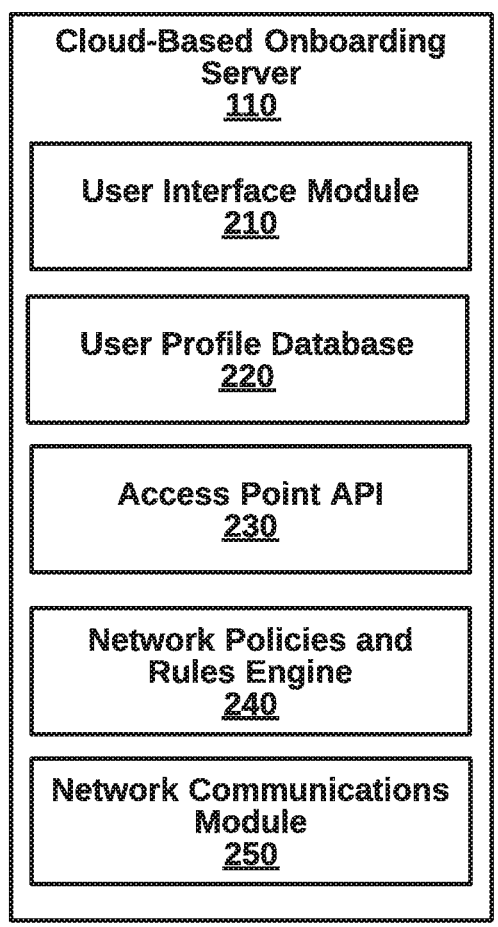
FIG. 2 is a more detailed block diagram illustrating a cloud-based onboarding server of the system of FIG. 1A, according to one embodiment.

FIG. 2 is a more detailed block diagram illustrating the cloud-based onboarding server 110 of the system of FIG. 1, according to one embodiment. The cloud-based onboarding server 110 of this embodiment includes a user interface module 210, a user profile database 220, an access point API 230, a network policies and rules engine 240, and a network communication module 250.

The user interface module 210 provides access for users through a network browser or client-side mobile app, for example, to control a network. In one embodiment, high level settings are provided for average home users. In another embodiment, granular settings are provided for network administrators to set configurations. Settings can be saved as rules that are applied against data.

The user profile database 220 saves specific settings on a per-user, per-institution, per-entity basis, for instance. In one setting, a user can designate graphically from a mobile app which access point is designated as master and which as slaves. The information is stored and can be used when applying the rules of a user profile. Users can be, without limitation, network administrators, home owners, hot spot operator, smartphone users, employees on a PC, and the like.

The access point API 230 handles transactions and communications with access points being controlled by one or more customers. Configuration parameters, passphrases, authentication data, user information, device information, WDS info, and the like, can be sent from the access point API 230. Data is from access points is also received, including status, identification information for new access points, data about connected user stations, and more.

The network policies and rules engine 240 applies user settings to specific data. In one example, a rule for when a new SSID should be set up automatically from the cloud is executed. If an access point has left the local Wi-Fi network for more than a certain time period, then the action is for the a new SSID identification and passphrase to be transmitted to each access point of a user.

The networking communication module 240 can comprise networking interface components such as Wi-Fi radios, Wi-Fi antennae, transceivers, coders and decoders, digital signal processors, and other supporting lower level hardware and processes necessary for communication across channels. The networking hardware 240 can support different variations of IEEE 802.11, including multiple input/multiple output (MIMO) and other techniques. Returning to the task of sending generated parameters to slave base stations, data packets sent over the data network are received by an interface to a cellular data network (e.g., Verizon 4G cellular data network). A cellular data network including, for example, cell towers pass the data packets to wireless stations.

Figure 3:
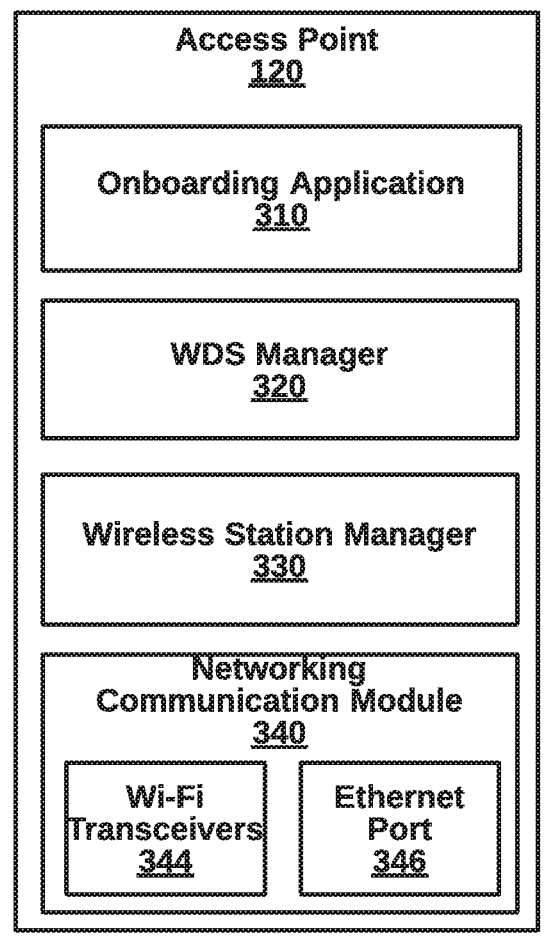
FIG. 3 is a more detailed block diagram illustrating an access point of the system in FIGS. 1A-D, according to one embodiment.

FIG. 3 is a more detailed block diagram illustrating an access point 120 (generically representing the access points 120A-C) of the systems 100A-D of FIGS. 1A-D, according to one embodiment. The access point 120 includes an onboarding application 310, a WDS manager 320, a wireless station manager 330, and a networking communication module 340.

The onboarding application 310 can be executed as part of an operating system, or alternatively, as an (downloaded) application interacting with an operating system. The onboarding application 310 assists other access points by setting up a temporary Wi-Fi channel, or assists a host access point by accessing a temporary Wi-Fi channel, for set up. The onboarding application 310, in one embodiment, also receives WDS configuration data indicating whether to go into master mode or slave mode, using the WDS manager 320. Many other network configurations are possible.

The wireless station manager 330 registers wireless stations directly connecting without an intervening slave access point. In some cases, wireless stations can be handed off to other access points when moving from a radio range of one device to a radio range or another device.

The networking communication module 340 comprises a Wi-Fi transceiver 344 and an Ethernet port 346. In one instance, IEEE 802.11 network packets are received from wireless stations and are transformed to Ethernet packets forwarded to the destinations on the network 101. The reverse data path is also handled by the networking communication module 340. Other embodiments with different transceivers are possible.

Figure 4:
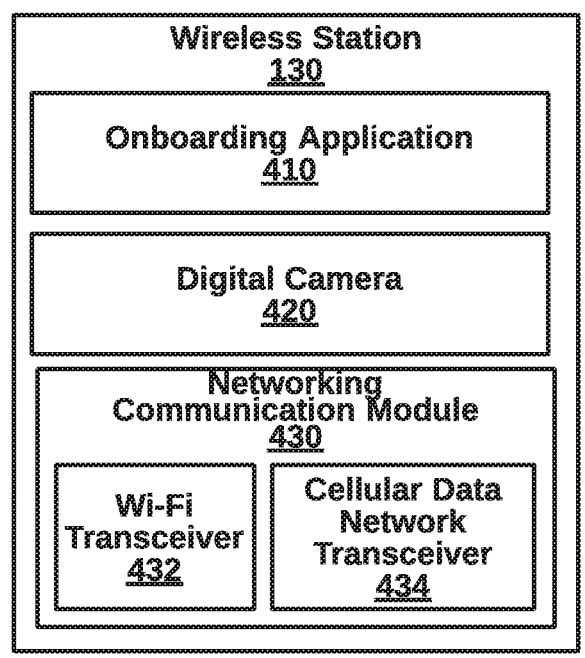
FIG. 4 is a more detailed block diagram illustrating a wireless station of the system of FIG. 1B-D, according to an embodiment.

FIG. 4 is a more detailed block diagram illustrating the wireless station 130 of the system of FIG. 1, according to an embodiment. The wireless station 130 includes an onboarding application 410, a digital camera 420, and a networking communication module 430.

The onboarding application 410 can be executed as part of an operating system, or alternatively, as an application interacting with an operating system. The onboarding application 410 communicates with peers on master and slave stations as well as cloud-based onboarding servers. A user interface component allows a user to log in to the server and make configuration changes. One embodiment notifies users in an animated manner of how to scan an onboarding access point. One embodiment recognizes wen the wireless station 130 is out of range for Wi-Fi communications via the Wi-Fi transceiver 432 during set-up and in response, uses cellular communications via the cellular data network transceiver 434 to reach the configuration serer 110 or the master access point 120A.

Figure 5:
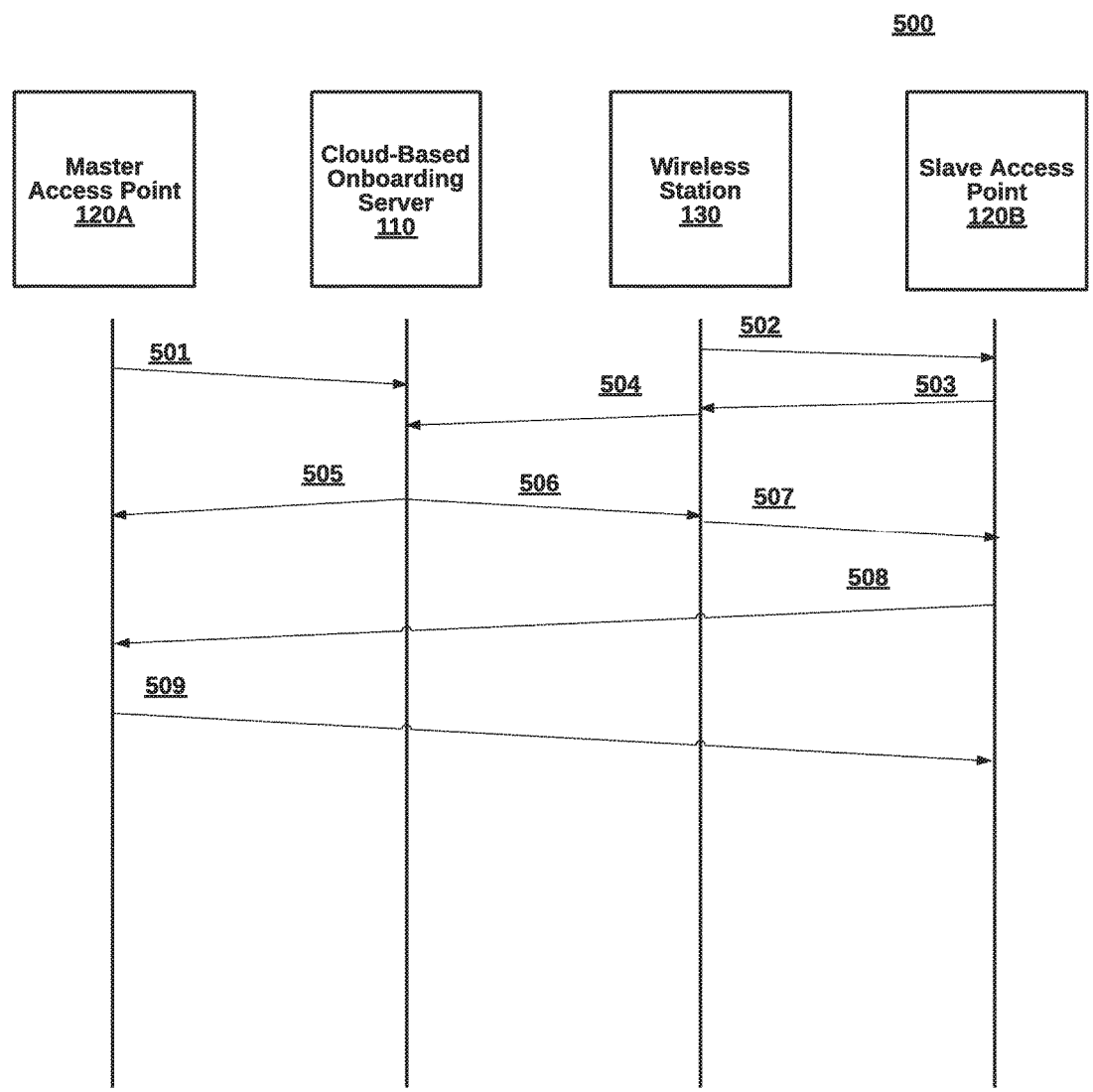
FIG. 5 is a sequence diagram illustrating interactions between components of the system in FIG. 1C, according to one embodiment.

FIG. 5 is a sequence diagram illustrating interactions 500 between components of the systems in FIGS. 1B and 1C. The specific interactions shown in FIG. 6 and described below can be performed in different orders, can include many sub-interactions, and still be contemplated by the present disclosure. Moreover, the methods below of FIGS. 6-7 describe processes that are internal to the components, as opposed to the external messages exchanged in FIG. 5.

Returning to FIG. 5, the master access point 120A connects with the cloud-based onboarding server 110 (interaction 501) using an onboarding application. Separately, the slave access point 120B, after being scanned by the wireless station 130 (interactions 502, 503), connects with the cloud-based onboarding server 110 using an onboarding application through either Wi-Fi as in FIG. 1B or cellular networks as in FIG. 1C (interactions 504).

WDS configuration data, such as identification information or a passphrase, is sent to the master access point 120A (interaction 505) and, optionally, to the slave access point 120B through the wireless station 130 (interactions 506, 507). Finally, the WDS configuration data facilitates a temporary Wi-Fi channel and, ultimately a persistent Wi-Fi channel between the slave access point 120B and the master access point 120A (interaction 508) and an acknowledgment of the connection can be returned (interaction 509).

II. Methods for Wireless WDS Configuration (FIGS. 6-7)

Figure 6:
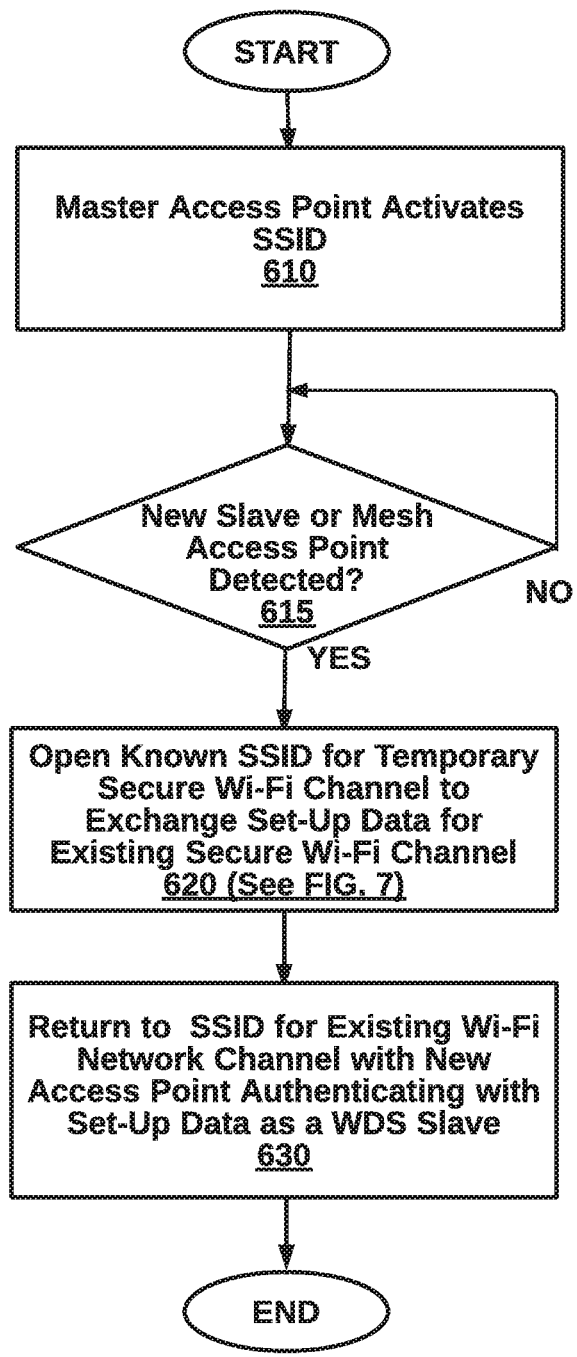
FIG. 6 is a high-level flow diagram illustrating a method 600 for plug and play configuring of extension of Wi-Fi for extending Wi-Fi networking range using WDS bridges, according to one embodiment.
Figure 7:
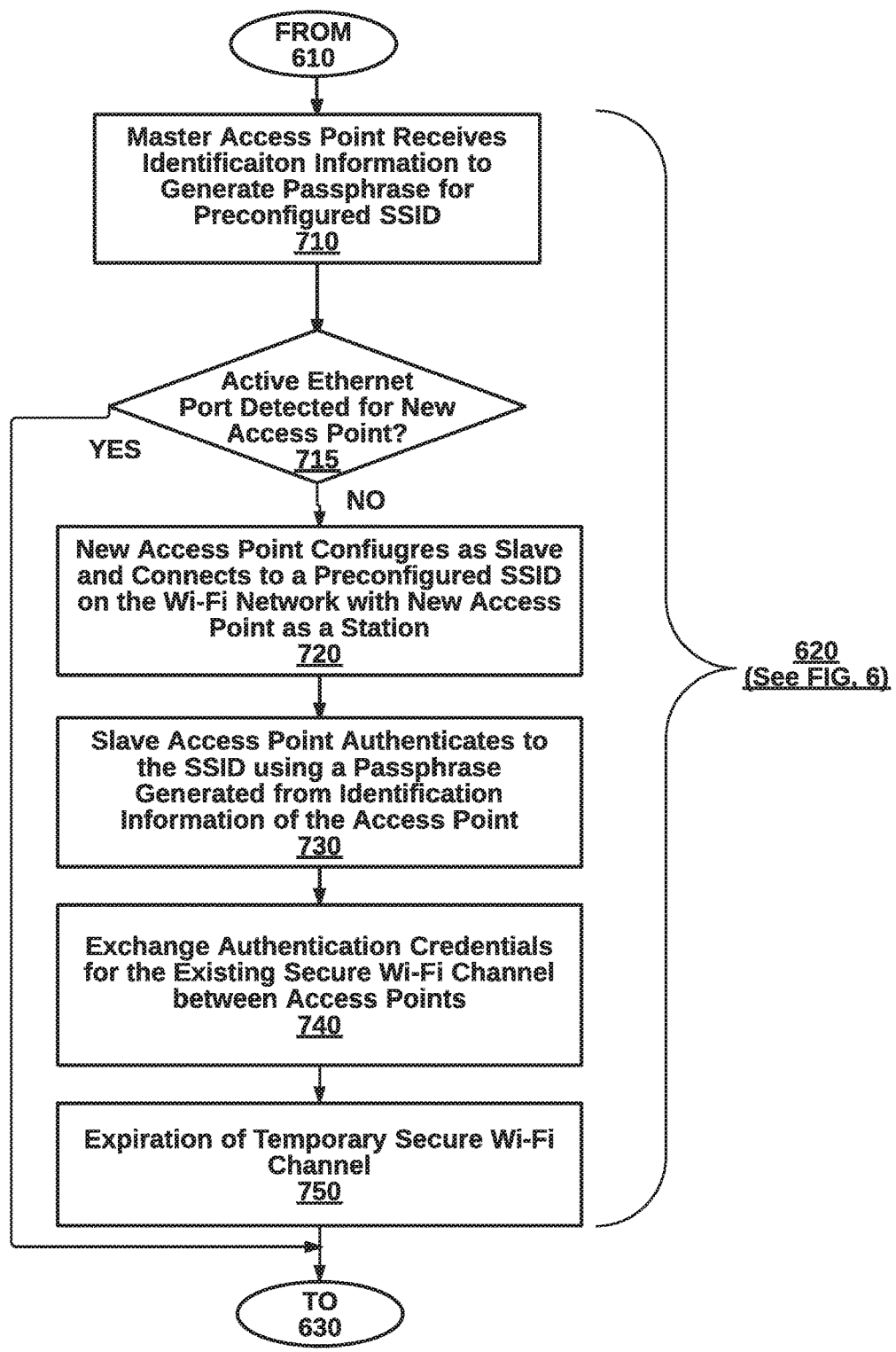
FIG. 7 is a more detailed flow diagram illustrating a step 620 of opening an SSID for a temporary secure Wi-Fi channel, from the method of FIG. 6.

FIG. 6 is a high-level flow diagram illustrating a method 600 for plug and play configuring of extension of Wi-Fi for extending Wi-Fi networking range using WDS bridges, according to one embodiment. The method 600 is one example of the operation for the systems 100A-D.

At step 610, a master access point activates an SSID for a secure Wi-Fi channel. A new slave or mesh access point seeking to join the Wi-Fi channel is detected at step 615. For example, a new access point out of the box can be configured with the secure Wi-Fi channel in a plug-and-play manner.

In response, at step 620, the master access point opens a known SSID to temporarily establish a secure Wi-Fi channel to exchange set-up data for the previously activated Wi-Fi channel, having a SSID that can be secret or otherwise concealed. More details for the step 620 are set forth below in association with FIG. 7.

Once data is exchanged or time has expired, at step 630, the master access point returns to the previously activated Wi-Fi channel, using the secret SSID.

FIG. 7 is a high-level flow diagram illustrating a method 700 for plug and play configuring of extension of Wi-Fi for extending Wi-Fi networking range using WDS bridges, according to one embodiment.

At step 710, a master access point receives identification information to generate a passphrase for a preconfigured SSID.

At step 715, if an active Ethernet port is not detected, a new access point configures as a slave and connects to a preconfigured SSID on the Wi-Fi network as a station, in step 720. At step 730, the slave access point authenticates to the SSID using a passphrase generated from identification information. If at step 15, an Ethernet port is detected, the steps can be bypassed for alternative connection techniques.

At step 740, authentication credentials for the existing secure Wi-Fi channel are exchanged between the master and slave access point. At step 750, the temporary Wi-Fi channel expires, ending automatically after 5 minutes or some other amount of time, or ending once the slave access point acknowledges that credentials have been received.

III. Generic Computing Device (FIG. 8)

FIG. 8 is a block diagram illustrating an exemplary computing device 800 for use in the systems 80A-B of FIGS. 1A-B, according to one embodiment. The computing device 800 is an exemplary device that is implementable for each of the components of the system 80, including the cloud control element 18, the access points 121A,B, 131, and the station 130. The computing device 800 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 800, of the present embodiment, includes a memory 88, a processor 820, a storage drive 830, and an I/O port 840. Each of the components is coupled for electronic communication via a bus 899. Communication can be digital and/or analog, and use any suitable protocol.

The memory 88 further comprises network applications 812 and an operating system 814. The network applications 812 can include the modules of the components illustrated in FIG. 1. Other network applications 812 can include a web browser, a mobile application, an application that uses networking, a remote application executing locally, a network protocol application, a network management application, a network routing application, or the like.

The operating system 814 can be one of the Microsoft Windows® family of operating systems (e.g., Windows 95, 98, Me, Windows NT, Windows 2000, Windows XP, Windows XP x64 Edition, Windows Vista, Windows CE, Windows Mobile, Windows 8 or Windows 8), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 820 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 820 can be single core, multiple core, or include more than one processing elements. The processor 820 can be disposed on silicon or any other suitable material. The processor 820 can receive and execute instructions and data stored in the memory 88 or the storage drive 830.

The storage drive 830 can be any non-volatile type of storage such as a magnetic disc, EEPROM, Flash, or the like. The storage drive 830 stores code and data for applications.

The I/O port 840 further comprises a user interface 842 and a network interface 844. The user interface 842 can output to a display device and receive input from, for example, a keyboard. The network interface 844 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

IV. Additional Embodiments

Generally, one of ordinary skill in the art will recognize that the examples set forth herein are non-limiting and only illustrative of widely-applicable principles. Accordingly, this description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method in a cloud-based Wi-Fi onboarding server of a data communication system, implemented at least partially in hardware, for secure plug and play configuration of wireless distribution system (WDS) Wi-Fi range extenders, the method comprising the steps of:
   receiving identification information about a new access point, from an active access point that is also connected for management by the cloud-based Wi-Fi onboarding server and is authenticated for secure communication on a Wi-Fi network remote from the cloud-based Wi-Fi onboarding server or from a wireless station authenticated to the cloud-based Wi-Fi onboarding server, the identification information being sent on behalf of the new access point but not sent by the new access point;
   associating the active access point already connected to the Wi-Fi network to the new access point;
   sending the passphrase to the active access point for use in a temporary secure channel between the active access point and the access point, the passphrase generated from the identification information which is known to the new access point, wherein the active access point and the new access point use a temporary Wi-Fi channel with a known SSID authenticated with the passphrase, to exchange permanent secure channel information over the temporary secure channel, and wherein the permanent secure channel provides external network access to the access point through the master access point.

2. The method of claim 1, wherein the received identification information is received from a user station having an alternative wireless communication channel that is distinct from wired communication channel used by the active access point and is distinct from the Wi-Fi network used by the user station to communication with the access point.

3. The method of claim 1, wherein the access point connects to the active access point using a pre-configured SSID known to both the access point and the active access point prior to the step of receiving the identification information.

4. The method of claim 1, further comprising:
   receiving a designation that the access point has been designated as a WDS master access point;

identifying one or more access points on the Wi-Fi network that are affected by the designation as the WDS master access point; and sending configuration information to the one or more access points and to the WDS master access point to implement the designation.

5. The method of claim 1, wherein the identification information sent by the user station is scanned by the user station from the access point.

6. The method of claim 1, wherein the temporary secure channel is accessed with a preconfigured SSID, known to the access point and the active access point, and the access point using the paraphrase to authenticate to the active access point, the paraphrase being based on the identification information in order to match paraphrase generated by the cloud-based Wi-Fi onboarding server.

7. The method of claim 1, further comprising:

prior to receiving the identification information of the access point, establishing a secure data channel with the active access point.

8. The method of claim 1, wherein the access point uses the secure data channel, established with the active access point, to service user stations wirelessly connected to the access point for external network access.

9. The method of claim 1, wherein the identification information comprises a MAC address of the access point.

* * * * *